United States Patent
Recaman Gonzalez

(10) Patent No.: US 11,065,847 B2
(45) Date of Patent: Jul. 20, 2021

(54) METHOD FOR THE PRODUCTION OF MULTILAYER LAMINATED BOARD AND RESULTING BOARD

(71) Applicant: Financiera Maderera, S.A., La Coruña (ES)

(72) Inventor: Santiago Recaman Gonzalez, La Coruña (ES)

(73) Assignee: Financiera Maderera, S.A., Santiago de Compostela la Coruña (ES)

( * ) Notice: Subject to any disclaimer, the term of this patent is extended or adjusted under 35 U.S.C. 154(b) by 216 days.

(21) Appl. No.: 16/078,701

(22) PCT Filed: Feb. 23, 2017

(86) PCT No.: PCT/ES2017/070101
§ 371 (c)(1),
(2) Date: Aug. 22, 2018

(87) PCT Pub. No.: WO2017/144760
PCT Pub. Date: Aug. 31, 2017

(65) Prior Publication Data
US 2019/0299570 A1 Oct. 3, 2019

(30) Foreign Application Priority Data
Feb. 23, 2016 (WO) .................. PCT/ES2016/070114

(51) Int. Cl.
*B32B 21/02* (2006.01)
*B32B 7/12* (2006.01)
(Continued)

(52) U.S. Cl.
CPC ............... *B32B 21/02* (2013.01); *B27N 3/02* (2013.01); *B27N 3/04* (2013.01); *B27N 7/005* (2013.01);
(Continued)

(58) Field of Classification Search
CPC ..... B32B 21/02; B32B 21/14; B32B 2260/14; B32B 2260/00; B32B 2260/02;
(Continued)

(56) References Cited

U.S. PATENT DOCUMENTS

2004/0028934 A1 2/2004 Preston et al.
2006/0102278 A1 5/2006 Liu et al.
(Continued)

FOREIGN PATENT DOCUMENTS

| DE | 10049050 A1 | 4/2002 | |
|----|----|----|----|
| EP | 0628670 A1 * | 12/1994 | ............... E06B 5/16 |
| WO | WO 2001/79339 A1 | 11/2001 | |

OTHER PUBLICATIONS

International Search Report dated Sep. 19, 2017 in connection with International Application No. PCT/ES2017/070101.

*Primary Examiner* — Camie S Thompson
(74) *Attorney, Agent, or Firm* — Gary J. Gershik; Cooper & Dunham LLP

(57) ABSTRACT

The method is carried out by means of the stacked deposition of a series of layers of fibers and/or particles with a binder material and/or other chemical additives on a conveyor belt until a multilayer mat is produced, in which the layers are physically different from one another. The method comprises:
 defining the final thickness and density of the board;
 defining the number of layers forming the board and the type of material to be used for each layer;
 selecting and preparing the constituent material of each layer to be formed;
 depositing, in a stacked and staggered manner, the layers previously defined according to weight per m2 of each layer;
 pre-compacting and, optionally, pre-heating the mat;
 compacting the mat using pressure and heat.

(Continued)

The invention also relates to the board produced using said method for the production of a symmetrical or asymmetrical, stable board.

20 Claims, 14 Drawing Sheets

(51) Int. Cl.
*B32B 21/14* (2006.01)
*B27N 3/04* (2006.01)
*B27N 3/02* (2006.01)
*B27N 7/00* (2006.01)

(52) U.S. Cl.
CPC ............. *B32B 7/12* (2013.01); *B32B 21/14* (2013.01); *B32B 2260/04* (2013.01)

(58) Field of Classification Search
CPC ........ B32B 2260/023; B32B 2260/025; B32B 2260/026; B32B 2260/046; B32B 2260/04; B32B 5/16; B32B 5/24; B32B 5/28; B32B 7/00; B32B 7/02; B32B 27/02; B32B 27/04; B32B 27/12; B32B 27/08; B32B 2250/02; B32B 2250/03; B32B 2250/04; B32B 2250/05; B32B 2250/20; B32B 2250/40; B32B 2250/44; B32B 2255/00; B32B 2255/02; B32B 2255/04; B32B 2255/08; B32B 2255/10; B32B 2264/00–504; B32B 2307/718; B32B 2433/00; Y10T 428/249972; Y10T 428/253; Y10T 428/2991; Y10T 428/254; Y10T 428/31989; Y10T 428/31978; Y10T 428/31982; B27N 1/006; B27N 1/02; B27N 3/002; B27N 3/02; B27N 3/04; B27N 3/14; B27N 7/005; C08L 97/02; C08L 2666/02
USPC ....... 428/292.4, 313.5, 411.1, 537.1; 525/13; 156/583.5; 264/112; 524/13
See application file for complete search history.

(56) References Cited

U.S. PATENT DOCUMENTS

| | | |
|---|---|---|
| 2011/0003136 A1 | 1/2011 | Schmidt et al. |
| 2013/0183517 A1 | 7/2013 | Weinkötz et al. |

\* cited by examiner

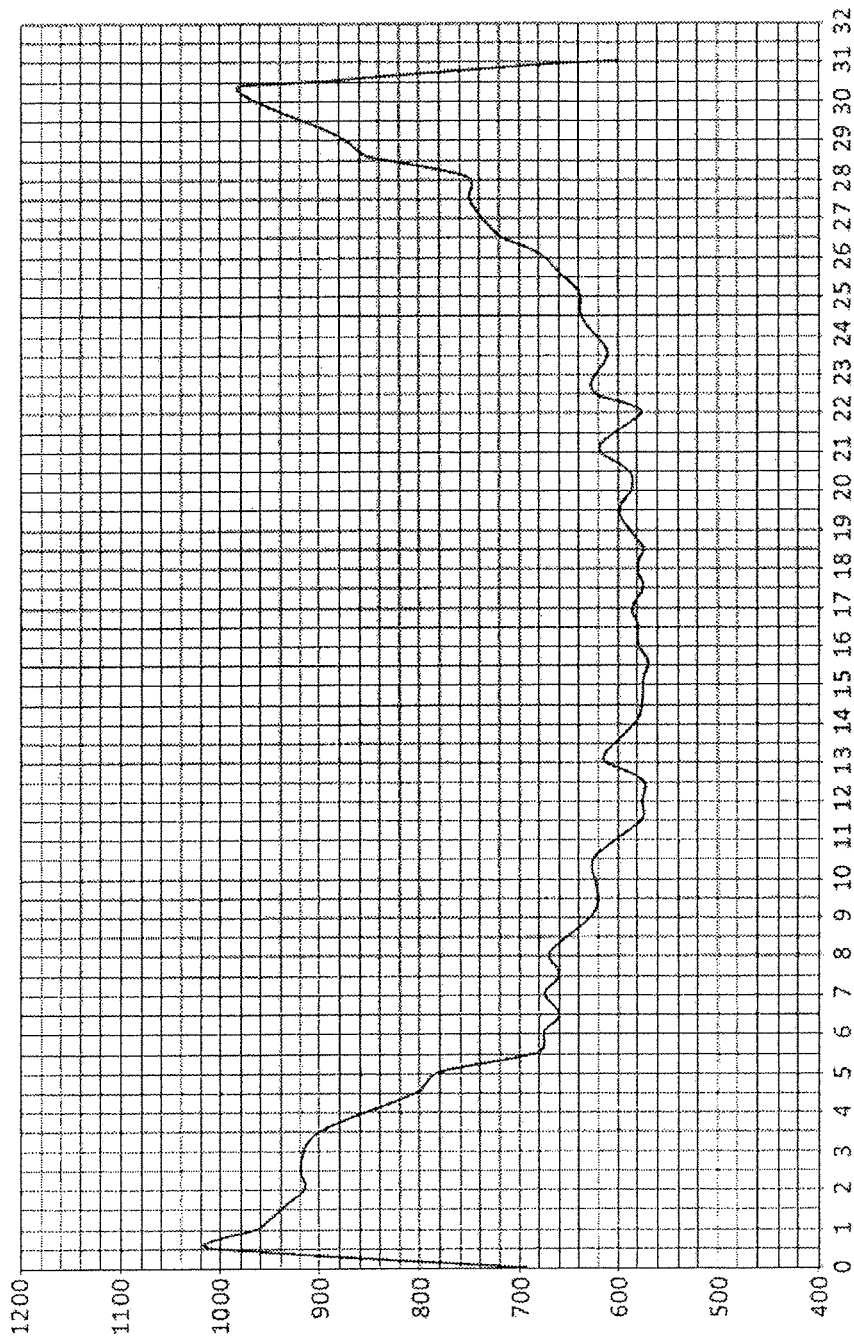
FIG. 4.1

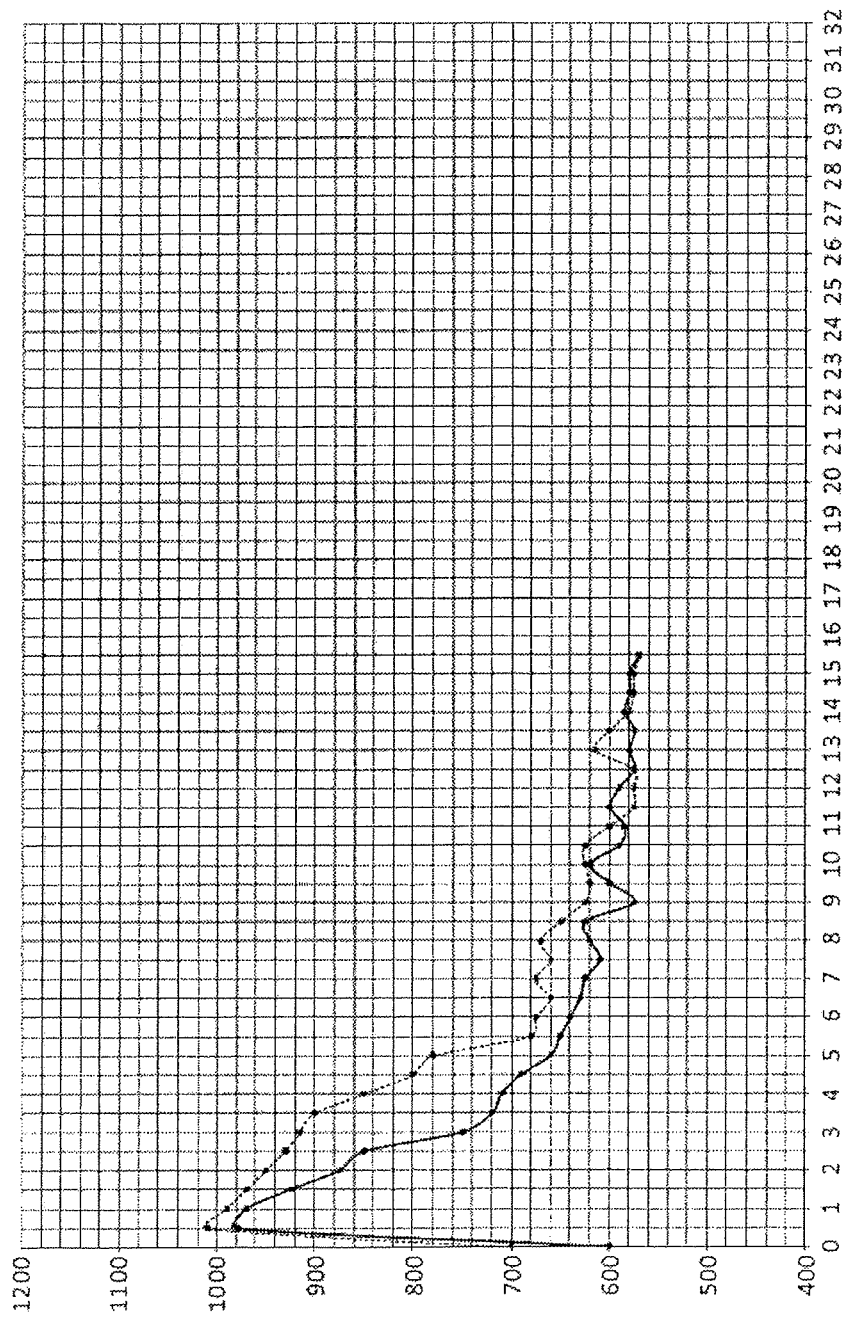
FIG. 4.2

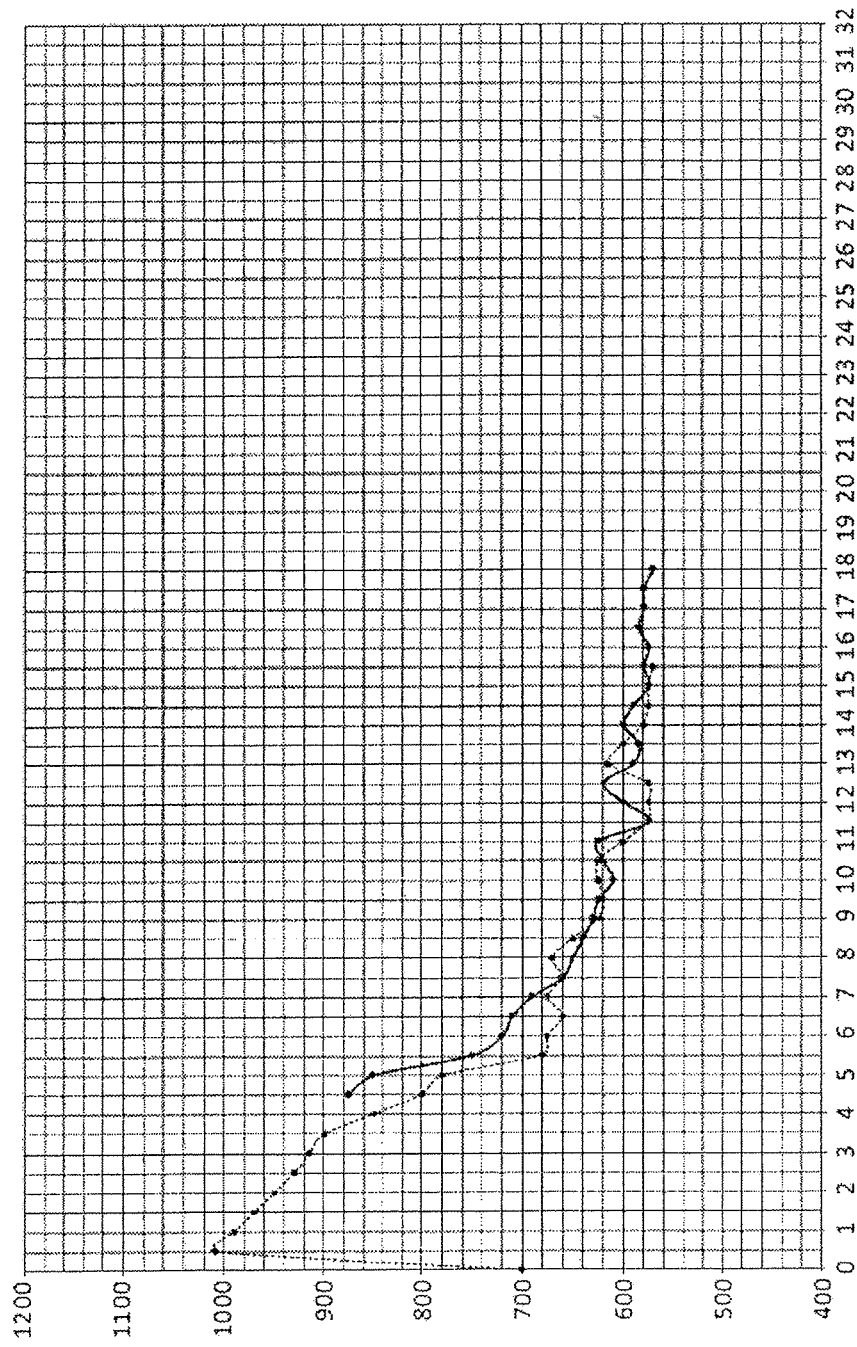
FIG. 4.3

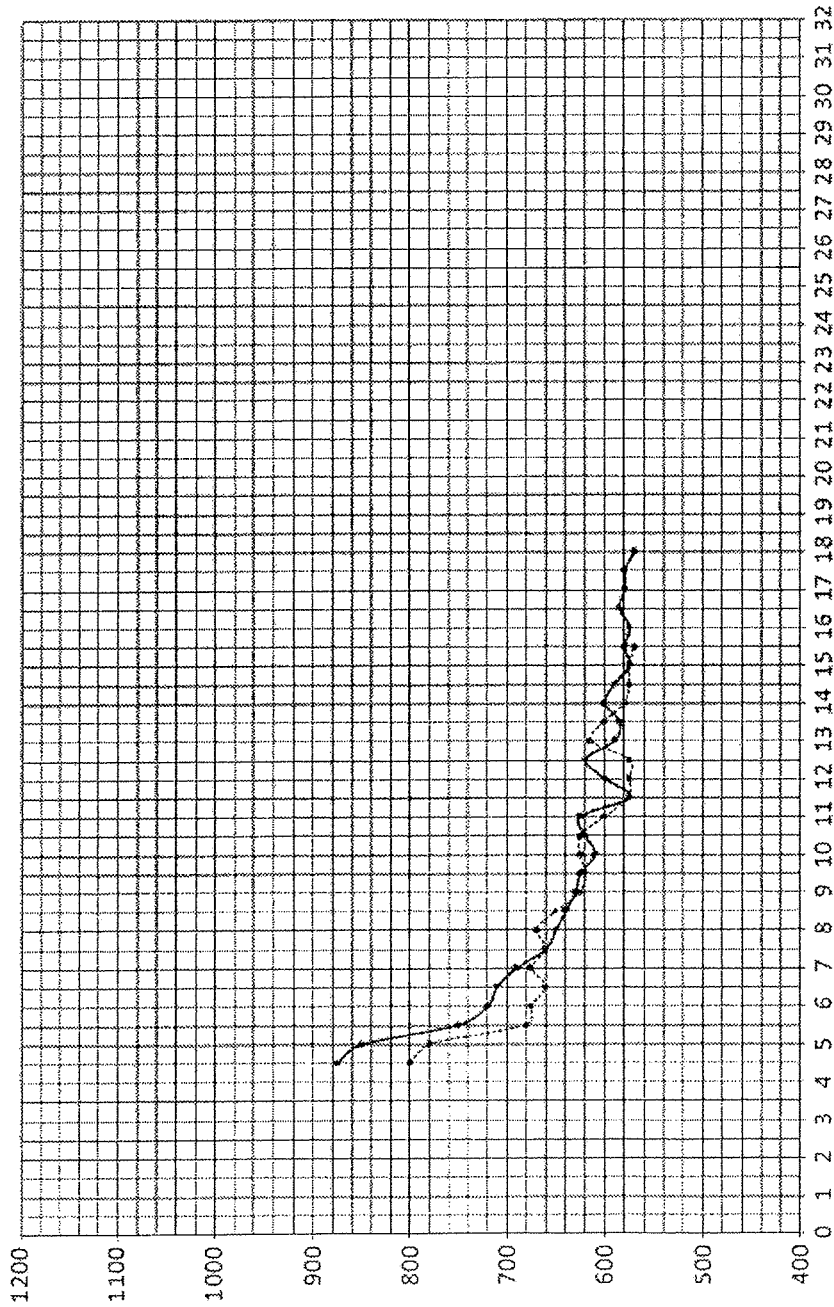
FIG. 4.4

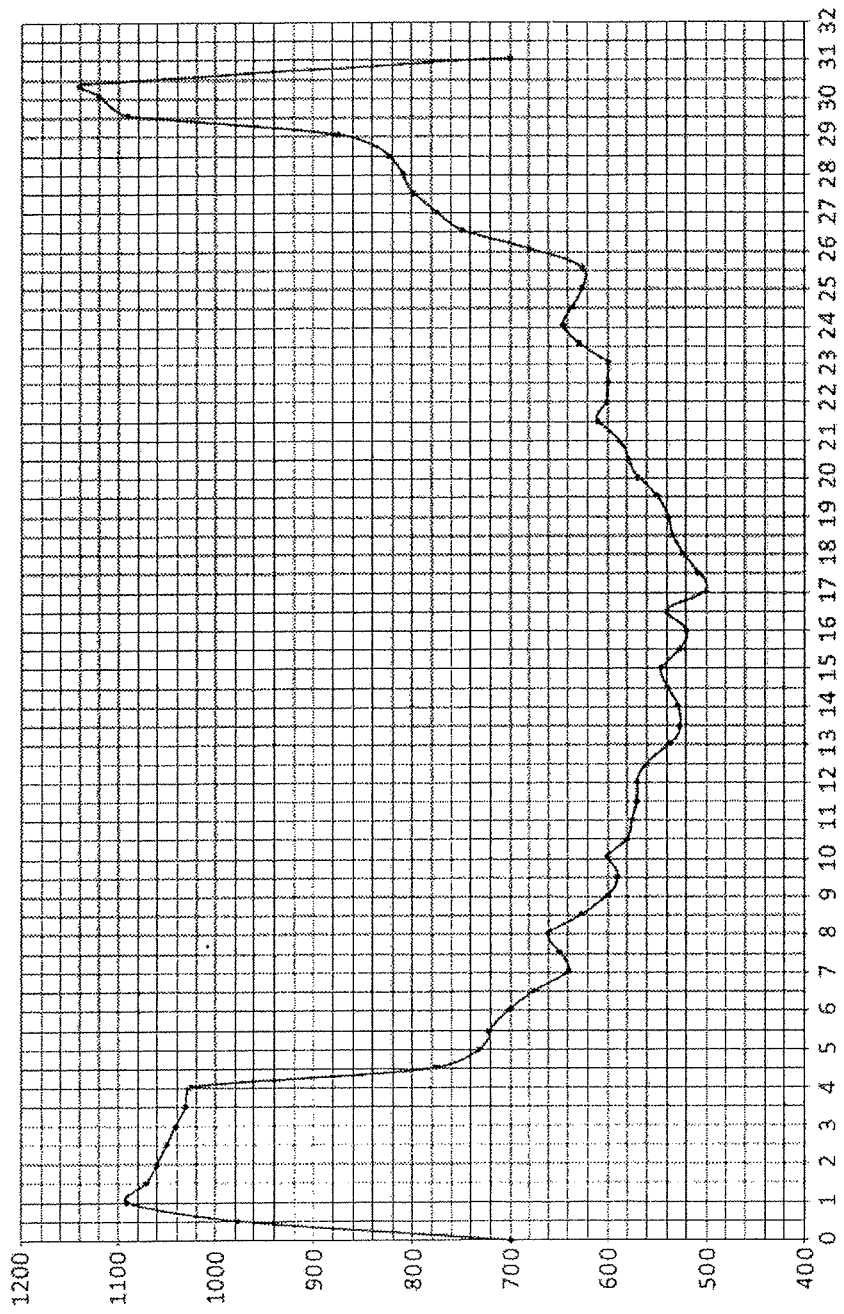
FIG. 5.1

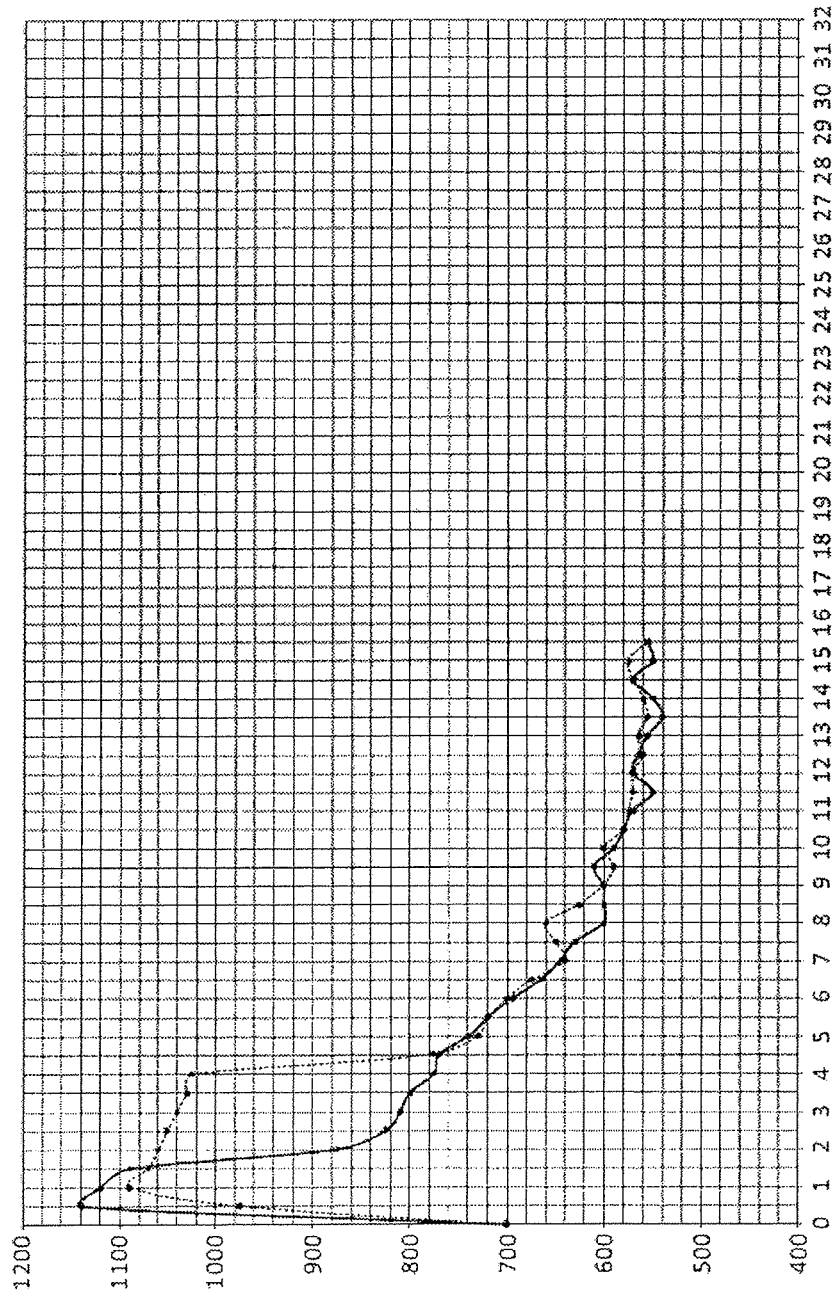
FIG. 5.2

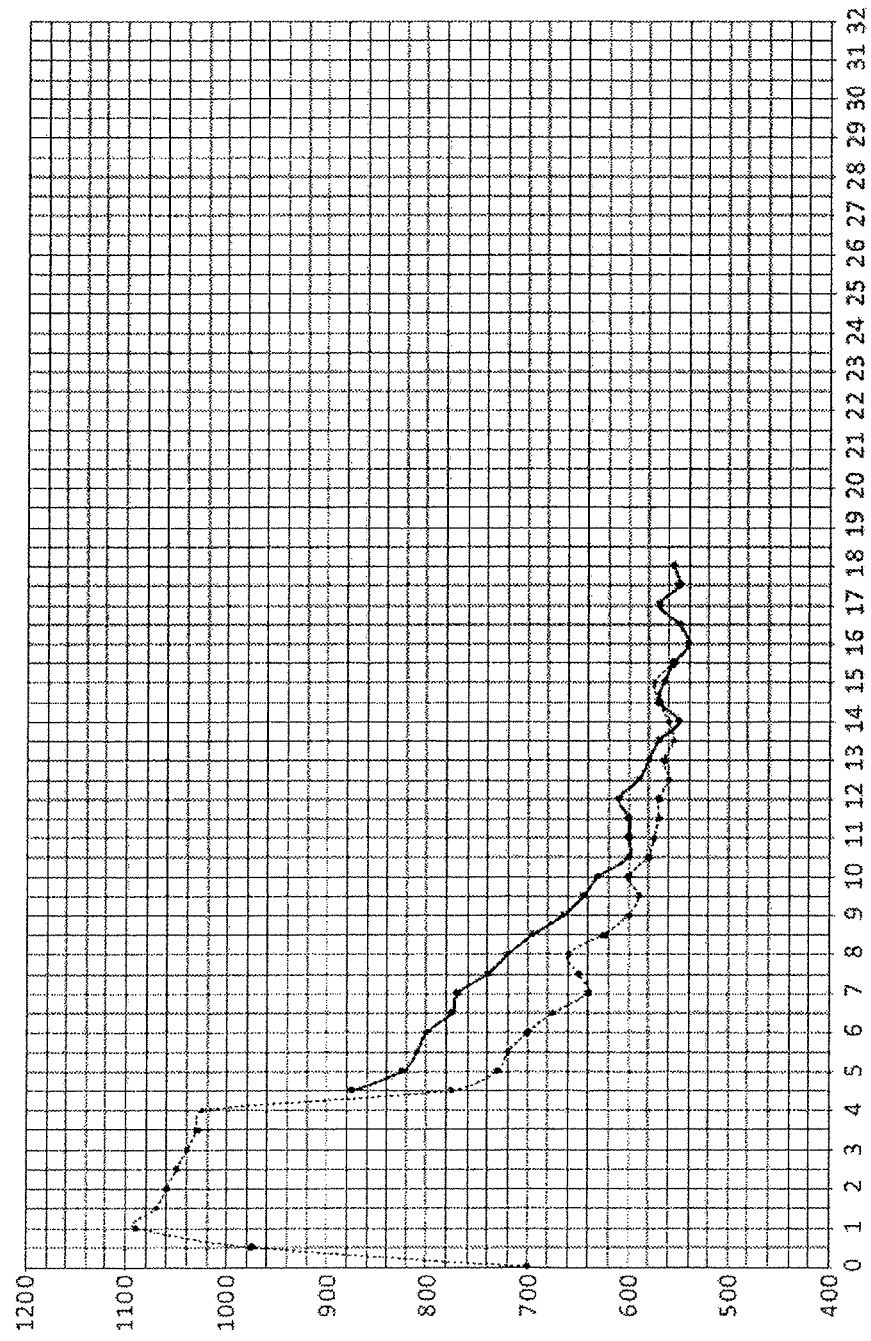
FIG. 5.3

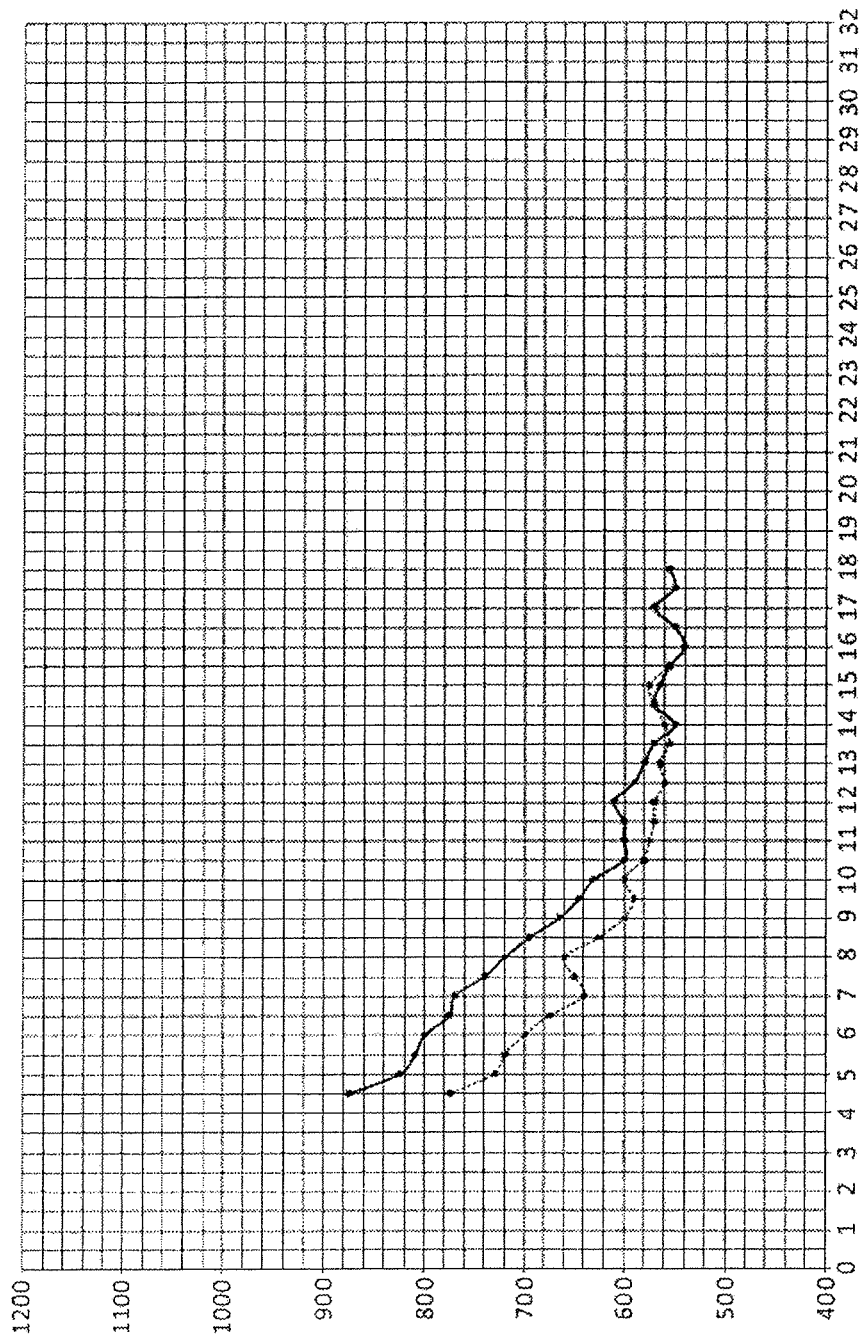
FIG. 5.4

METHOD FOR THE PRODUCTION OF MULTILAYER LAMINATED BOARD AND RESULTING BOARD

RELATED APPLICATIONS

This application is a § 371 national stage of PCT International Application No. PCT/ES2017/070101, filed Feb. 23, 2017, claiming priority of PCT International Application No. PCT/ES2016/070114, filed Feb. 23, 2016, the contents of each of which are hereby incorporated by reference into this application.

FIELD OF THE INVENTION

The object of the invention pertains to the technical field of the production of wood fiber or particle boards or panels that are mixed with binder materials and that, subjected to pressure and heat, obtain a compact and stable article, suitable for a number of applications related to the wood industry, such as, for example, furniture, flooring, packaging, wrapping, construction, etc.

Among the products that can be manufactured in this technical field, we can highlight wood particle boards usually called chipboard, medium-density fiberboards, also known as MDF or MD, high-density fiberboards and phenolic compact boards.

BACKGROUND OF THE INVENTION

Wood has been used by man since ancient times. The use thereof as a fuel, a constructive element and a raw material for paper, tools and furniture has accompanied man since early times.

The use of products derived from wood is linked to economic development and the use thereof is correlated with the Gross Domestic Product (GDP), where countries with higher rates are those with greater consumption. This has led many countries to have a deficit in wood, since territories that have these deficits are not able to generate the resource due various impediments, such as bioclimatic aspects, land use or demographic pressure. Furthermore, these societies call for a use of the forests that is not only productive, but also recreational and environmental.

In this context, the effective use of the resource is increasingly imperative, and improvement in the processes makes it possible to add value to raw materials of an increasingly smaller size. Adapting the industry of wood panel production to these needs is one typical example. As in ancient times, only the best pieces of solid wood were used to produce furniture, and currently wood is used which, incorporated in the processes of binding and/or MDF and/or paper pulp production, allows for the manufacture of quality furniture by using panels produced in the previous processes and subsequently decorated with designs printed on resin impregnated paper.

Furthermore, this improvement in the effective use of the wood has been carried out without losing significant value in terms of technical characteristics, and it has even been able to improve the performance of a characteristic, such as anisotropy resulting from the constitution and anatomy thereof.

The improvement in the anisotropy of the wood has been a clear development vector in the industry of producing products derived from wood and specifically, the production of chipboard, MDF or a combination of both.

This characteristic is clearly recognized as a drawback in the use of wood since it depends on the species used, the age thereof, and the part of the tree from which the piece is removed. Developments in the production of panels derived from wood have sought to reduce the impact thereof. The processes aim to obtain products with the best dimensional stability possible. To achieve this aim, one key aspect is the lack of differential stresses that may appear in the presence of warping. This is one of the causes for which production processes look for symmetry with respect to the plane passing through the center of the thickness of the board. Examples that demonstrate symmetry in the production processes are:
  thermal energy input through the heating plates is symmetrical as a result of common thermal oil input through the same pump to the upper and lower plate.
  the material used in the external layers has the same origin so that both the moisture thereof and the resin thereof are equal in both layers.

Therefore, the dimensional stability and specifically, the flatness or the absence of warping, is a basic characteristic that is sought for the wood panels (chipboard, MDF or a combination of both). Isotropic behaviors that improve the performance of natural wood are sought.

With regard to the process of producing boards, three technologies are defined that are based on how the mattress of materials, also called the mat, is formed:
1. MONOLAYER.—the processed material has the same origin and therefore the same characteristics. Only one single device is needed to construct the mat and the properties thereof are homogeneous throughout the entire height thereof. This s most commonly used in the production of MDF.
2. BILAYER.—technology with which material of the same origin is produced, and therefore, the characteristics thereof are equal. Two devices are used to construct the mattress. In these devices, distribution of the material flow that allows the construction of the mats that consume greater mass flows is carried out.
3. TRILAYER.—material of two different origins is produced in the process. Therefore, the possibility exists that each material has different characteristic values related to moisture, the presence of chemicals and granulometry. The two external layers have the same origin and the flow thereof is divided into two forming devices in which the addition of material of each layer is controlled to avoid dimensional problems. The internal layer is produced between the two previous layers and the moisture thereof is lesser in order to favor the flow of energy from the external layers towards the center. This method is the most common for chipboard.

These differences in the structure of mats then lead to significant differences in each layer/stratum in the pressing process. In this process, the effectiveness of the transfer of energy and the response of the mat to the pressure applied by the press is different in each layer/stratum and is related to the viscoelastic properties of wood, the diffusion of the vapor, etc., especially between the outermost layers and the center.

To prevent warping, the stresses in the structure of the board must be compensated. Therefore, suppliers of machinery focus their efforts on developing equipment and production methods that favor a resulting symmetry with respect to the central plan in terms of forces. It can be confirmed, that producers of boards of any type are currently limited by the symmetry that said board must have.

The European patent EP-1140447 is known, which describes a device and a method for continuously producing boards formed by a particle core and fiber layers in the external faces thereof. In said production process, the board is made by means of scattering, especially of particles mixed with a binder, such as, for example, ligno-cellulose and/or fibers, chips or like particles, which contain cellulose, in order to form a non-woven material, especially to produce formed objects, mainly in the shape of plates or boards; such that the devices has at least one dosing tank, which contains the particles, with at least one particle scattering station arranged after the dosing tank and with a forming belt arranged under the scattering station to collect the non-woven material. Next, it has at least three scattering stations arranged one after another along the forming belt, where the first is provided for scattering fibers, the second for scattering particles and the third for scattering fibers once again; and the particle scattering station comprises a fractionating device for separating the fine and coarse particles with at least two fractionation sections for fine particles and at least one fractionation section for coarse particles, at the same time that the fractionation sections for fine particles form the start and end areas of the fractionating device and the fractionating section for the coarse particles is arranged between the fractionating sections for the fine particles.

OBJECT OF THE INVENTION

The purpose of the invention is to achieve laminated boards by a number n of layers that are structurally stable, in other words, internal stresses that lead to the undesired warping of the board are not created in the produced board, and they maintain the flatness thereof, although they have a symmetrical or asymmetrical structure of layers by a method that ensures stability by means of the individual control of each layer and thus obtains flat, stable boards without internal stresses that cause warping thereof.

An object of the invention is a method as defined in claim 1 consisting of a method for the production of multilayer laminated boards, comprising a combination of fibers and/or particles with at least one binder and/or other chemical additives, said layers made by the stacked deposition thereof on a conveyor belt until a mat is produced which comprises fibers and/or particles in a multilayer form, in which the layers are physically different from one another, said method characterized in that it comprises:

defining the final thickness and density of the board;
defining the number of layers forming the board and the type of material to be used for each layer;
selecting and preparing the constituent material of each layer to be formed for the subsequent deposit thereof that comprises:
selecting fibers and/or particles,
selecting the granulometry of the constituent material of each layer,
selecting the ratio of the weight of binder material and/or other chemical additives to the weight of fibers and/or particles used in each layer; and
selecting the percentage of moisture of each layer of the mat, in which the external layer or layers that will form the board will have a maximum moisture content of 18% over dry weight of the product, and the internal layer or layers that will form the board will have a minimum moisture content of 3% over dry weight of the product, with an absolute difference of moistures between adjacent layers that will be in the range of 1 to 12 points based on the number of strata that form the mat, with a gradual distribution of moisture from the external layers to the geometric center of the board;
selecting and preparing each layer, which comprises the addition of fibers and/or particles with binder material and/or other chemical additives until a homogeneous mass is formed in which the weight thereof per m2 is the result of the product of the density of the material without moisture multiplied by the thickness of each layer and increased by the moisture percentage corresponding to said layer;
depositing, in a stacked and staggered manner, the layers previously defined according to weight per m2 of each layer, as defined in the preceding paragraph, a deposit that is carried out on a conveyor belt until the final formation of a mat defined by the stacking of multiple layers comprising fibers and/or particles and where the total number of layers included in said mat is equal to or greater than 4;
pre-compacting and, optionally, pre-heating the mat comprising fibers and/or particles mixed with binder substances and/or other chemical additives deposited on the conveyor belt;
compacting the mat, which comprises fibers and/or particles mixed with binder substances and/or other chemical additives deposited and pre-compacted in the previous steps, using pressure and heat until forming the final board, where the sum of material densities from the external layers to the geometric center of the board are substantially similar to both sides of the final board manufactured.

This method for the production of multilayer laminated boards is worth noting because the layers on either side of the geometric center of the board form a symmetrical or asymmetrical board by thickness of the layers and/or material used therein and/or by the number of deposited layers.

The moisture of each layer is defined by the water content over the dry product that integrates said layer, such that the net water content may be greater or lesser depending on the integrating material of each layer, the content provided by fibers and/or particles, the binder material and the additives, as well as the water that can be introduced into the process being included in this value. For this reason, when two layers that may come from the same or different material used, fibers, particles, etc. are compared, it is more logical to discuss the absolute difference of moistures, in other words, absolute values. The absolute difference of moistures between adjacent layers is preferably comprised between 1-10, and more preferably between 1-7.

As discussed regarding a similar value in the sum of material densities from the external layers to the geometrical center of the board on both sides of the final board, this value should be obtained with a certain tolerance, since it would already be very difficult to achieve identical values industrially; from here, it is said that the difference between both sums of densities of the layers on either side of the geometric center of the board has a maximum admissible variability of 10%, preferably 5% and more preferably 3%.

When the geometric center of the board is discussed, it should be understood as an imaginary point or plane that is equidistant and parallel to both faces of the formed board. The geometric center of the board may coincide with a plane of separation between layers of the board or it may be included within the thickness of a layer, dividing said layer into two areas, each one being considered, with regard to the sum of densities, as belonging to one area or another of the obtained board.

At least one of the external layers of the board is manufactured by means of fibers in order to give it a finish that is smoother and more uniform in appearance, and/or at least one of the external layers of the board is made from particles, obtaining a board with a different appearance since the particles that make up the board would be seen. In other words, boards are manufactured with an external fiber layer, with both external fiber layers, with a single external particle layer or with both external particle layers, or with an external fiber layer and the other external particle layer, if suitable.

The boards manufactured are suitable for receiving surface finishes in which at least one of the outer faces of the board is coated by lacquer and/or PVC coating and/or resin impregnated paper and/or natural veneer and/or HPL (High Pressure Laminate).

The binder or binders used for producing the board are selected from the group consisting of thermosetting resins, such as phenoplasts, aminoplasts and organic isocyanates which have at least two isocyanate groups, in thermoplastic resins and in bioresins. These binders may be used alone or combined.

Phenoplast resins are synthetic resins or modified products obtained by condensing phenol with aldehydes. In addition to unsubstituted phenol, the derivatives of phenol are used to produce phenoplast resins. These include cresols, xylenols and other alkylphenols (for example, p-tert-butylphenol, p-tert-octylphenol and p-tert-nonylphenol), arylphenols (for example, phenylphenol and naphthols) and divalent phenols (such as resorcinol and bisphenol A). The most important component of aldehyde is formaldehyde, which is used in various forms, including aqueous solution and solid paraformaldehyde, and also as compounds that lead to formaldehyde. Other aldehydes (for example, acetaldehyde, acrolein, benzaldehyde and furfural) are used to a more limited extent, since they are also ketones. Phenoplast resins can be modified by chemical reaction of methylol or phenolic hydroxyl groups and/or by physical dispersion in the modification agent (standard EN ISO 10082).

Preferred phenoplast resins are phenol aldehyde resins, more preferably phenol formaldehyde resins. Phenol formaldehyde resins (also called PF resins) are known in, for example, Kunststoff-Handbuch, 2nd edition, Hanser 1988, volume 10, "Duroplaste", pages 12 to 40.

As aminoplast resins, it is possible to use all the aminoplast resins known by persons skilled in the art, preferably those known for producing wood-based materials. Resins of this type and also the preparation thereof are described in, for example, Ullmanns Enzyklopadie der technischen Chemie, 4th revised and expanded edition, Verlag Chemie, 1973, pages 403 to 424 "Amino-plaste" and Ullmann's Encyclopedia of Industrial Chemistry, vol. A2, VCH Verlagsgesellschaft, 1985, pages 115 to 141 "Amino Resins" and also in M. Dunky, P. Niemz, Holzwerkstoffe and Leime, Springer 2002, pages 251 to 259 (UF resins) and pages 303 to 313 (MUF and UF with a small amount of melamine). In general terms, they are products of the polycondensation of compounds that have at least one amino group or carbamide group, optionally partially substituted with organic radicals (the carbide group is also called carboxamide group), preferably carbamide group, preferably urea or melamine and an aldehyde, preferably formaldehyde. The preferred products of polycondensation are urea-formaldehyde resins (UF resins), melamine-formaldehyde resins (MF resins) or urea-formaldehyde resins that contain melamine (MUF resins), more preferably urea-formaldehyde resins.

The particularly preferred products of polycondensation are those in which the molar ratio of the aldehyde to the amino group and/or carbamide group that are optionally partially substituted with organic radicals is in the range from 0.3:1 a 1:1, preferably from 0.3:1 to 0.6:1, more preferably from 0.3:1 to 0.55:1, very preferably from 0.3:1 to 0.5:1.

The aminoplast resins indicated are usually used in liquid form, usually as a solution of concentration of 25% to 90% by weight, preferably a solution of concentration of 50% to 70% by weight, preferably in an aqueous solution, but they can also be used in solid form. The solids content of the aminoplast resin in an aqueous liquid can be determined according to Gunter Zeppenfeld, Dirk Grunwald, Klebstoffe inder Holz- and Mobelindustrie, 2nd edition, DRW-Verlag, page 268.

When binders and/or chemical additives are added to the process for producing the laminated board of the invention, it may be necessary to apply pigments or ink that determine the final color of said board or of at least one of the layers of said board. The application of the pigments or ink is carried out in a way such that they are or are not mixed with the binders and/or additives.

Another object of the invention is the embodiment of a symmetrical or asymmetrical board manufactured according to the method described above, which comprises external fiber layers, while the inside thereof is divided into a central particle layer and particle layers on both sides of the central layer. With this board arrangement, it is recommended that the central particle layer has particles that are larger than the particles of the layers that are on both sides of the central layer, the larger particles being embedded inside the board and preventing them from moving to the surface, an undesired effect when producing boards that comprise particles.

Preferably, the structure of a board is formed by a structure like the one that follows:
 external fiber layer
 internal particle layer that in turn is divided into:
 outer external fine particle layer
 inner internal coarse particle layer
 outer external fine particle layer
 external fiber layer.

This structure is formed by 5 layers in which the external faces are occupied by fibers and particles mixed with binder substances and/or other chemical additives, of a small size and in which the center of the board structure is reserved for larger particles, thus preventing that the effect of movement mentioned above appears in the board.

The method for the production of a laminated board comprises the following steps:
 a) deposit on a first surface a plurality of fibers or particles mixed with binder substances and/or other chemical additives, controlling the weight of said layer and shaping a first external layer of the board to be formed. This deposit is made on a conveyor belt that moves while the fibers and/or particles that will form the first deposited layer or external layer of the finally formed board are deposited in the form of a mat;
 b) optionally and when the layer of the previous step is made of fibers, pre-compact using pressure;
 c) deposit multiple stacked layers of fibers or particles mixed with binder substances and/or other chemical additives on the first layer manufactured, individually controlling the weight of each layer. These multiple layers, upon manufacturing the final board of 5 layers, will be formed by a fine particle layer, followed by a coarse particle layer and subsequently followed by a fine particle layer;

d) deposit on a second surface a plurality of fibers or particles mixed with binder substances and/or other chemical additives, shaping a second external layer of the board, pre-compacting said layer in the case it is made of fibers, as occurs in layer b);

e) deposit the independent layer manufactured in step d) on the multiple layers previously deposited on the first surface in steps a) to c);

f) pre-compact and optionally pre-heat the assembly of layers deposited in the previous steps by means of reheated water vapor, reheated air, electrical stimulation (such as, for example, by high frequency, microwaves, etc.);

g) compact the multiple layers deposited in the steps a) to e) in order to form the board in the final thickness thereof by using pressure and heat.

The particles used are previously classified by size, grouping similar sized particles so that the layers that are formed in the structure of the board are as homogeneous as possible in each layer with regard to the particle size. These particles that are classified by size, in a preferred embodiment, are grouped to form pairs of layers of similar sized particles in the board to be formed.

Preferably, the layers of larger particles will be deposited in the central area of the board while those of smaller particles will be deposited progressively towards the external layers of the board to be formed, with the aim that the finish of the board is as uniform as possible. This order will make it easier for larger particles to be embedded inside the board and not be visible from the external layers of the same, providing a higher quality aesthetic appearance to the product.

BRIEF DESCRIPTION OF THE DRAWINGS

For the purpose of helping to make the characteristics of the invention more readily understandable, in accordance with a preferred practical embodiment thereof, said description is accompanied by a set of drawings constituting an integral part thereof which, by way of illustration and not limitation, represent the following:

FIG. 4 includes three representations of the same density profile of an asymmetrical board produced by conventional methods. In 4.1, the density profile of a board with external fiber layers, one of them being 4 mm and the other 2 mm, and one or several inner layers of particles, is shown. In 4.2, a representation of the overlaid graph of both faces is shown, which demonstrates the asymmetry of densities in the aforementioned board. In 4.3, the same exercise is carried out, but only with particle layers. This figure shows a board produced with the technology described in the European patent EP1140447, but producing an asymmetrical board which leads to an unstable board.

FIG. 5 includes three representations of the same density profile of an asymmetrical board produced by applying the method of the invention. In 5.1, the density profile of a board with external layers, one being 4 mm and the other 2 mm, and several inner particle layers is shown. In 5.2, a representation of the overlaid graph of both faces is shown, which demonstrates the asymmetry of densities in the aforementioned board. In 5.3, the same exercise is carried out, but only with particle layers. These asymmetries allow for the compensation of forces between strata.

DETAILED DESCRIPTION OF A PREFERRED EMBODIMENT OF THE INVENTION

In the production processes of fiber and/or particle boards, where the process is carried out by pressing a mat of fibers and/or particles mixed with binder material and/or other chemical additives, various factors are involved in this process, among which include the transfer of heat from the external layers in contact with the heated pressing plates to the internal layers, the transfer of mass between the layers and the chemical reactions for transforming the wood itself and the binder material.

In the normal process conditions for producing boards, the conditions provided on the surface and in the internal layers are very differente. Fundamentally, the most external layers transfer heat by conduction, while the convection processes gradually gain importance as the most internal layers are analyzed, which is also demonstrated in the different degrees of polymerization between the board layers.

Introducing high temperatures and moisture during pressing laminates the wood, which has an immediate effect on reducing the working pressure and, as a result, the density profile is altered. The softening temperature of the wood is strongly affected by the water content thereof.

Figure 1:
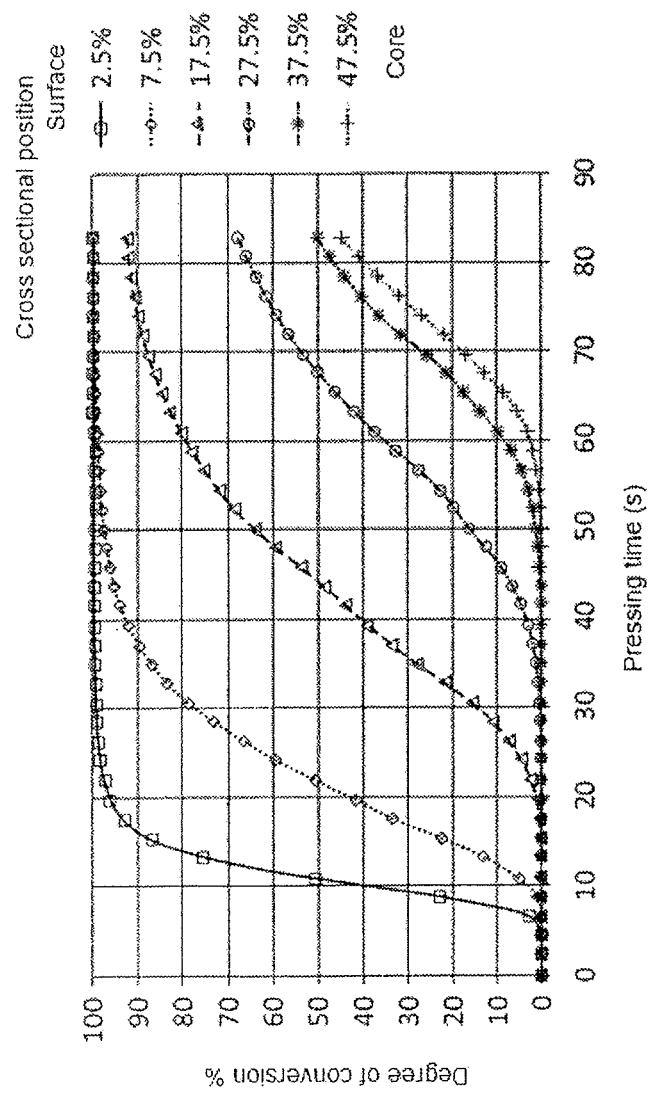
FIG. 1 shows a graph that displays the degree of polymerization of the resin in different strata of the board, how the board behaves in different strata due to the transfer of heat through the thickness of the board. Source: 8*th European Panel Products Symposium, Thermokinetic simulation of a hot press cycle in the production of particleboard and MDF.* Christian Heineman, Roland Mitter and Manfred Dunky.

FIG. 1 shows a graph in which the degree of polymerization of the resin in the different thicknesses of the board is represented. In this graph, it is observed how the external layers quickly reach a high degree of polymerization in a very short time, while the internal layers, according to how they are developed towards the core of the board, take more time to polymerize, since the transfer of heat from the external layers to the internal layers is possible thanks to the moisture of those layers that is transformed into water vapor that heats that central part of the board.

Figure 2:
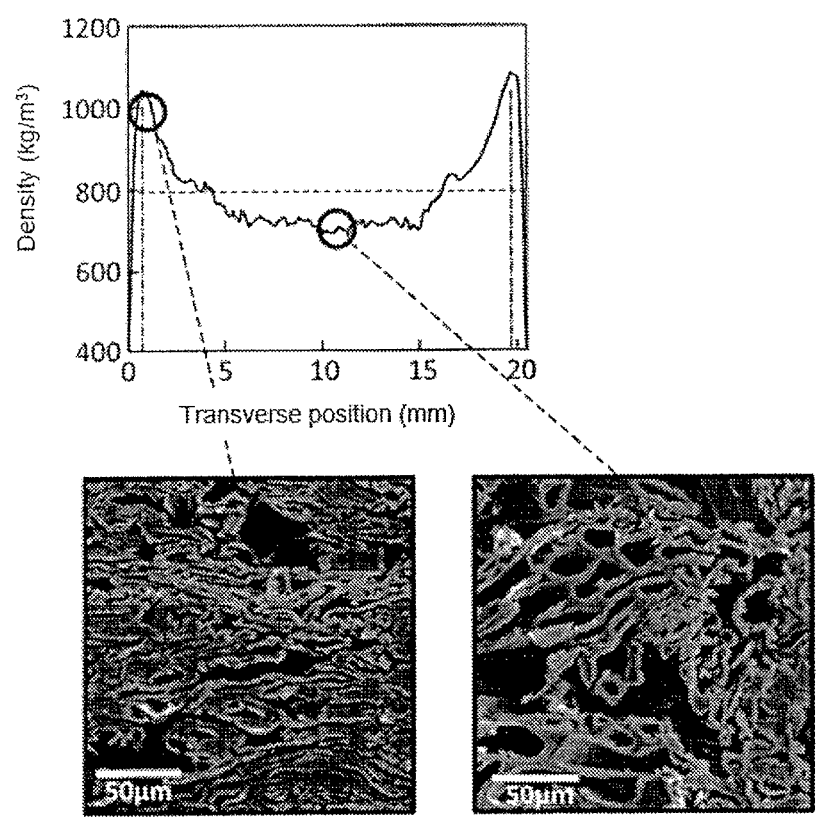
FIG. 2 makes it possible to observe the effect of the pressure applied on the formation of the board and how it leads to deformations of the wood cells, reducing the cell lumens, as shown in the lower images where the image on the left has a greater density and corresponds to the external layers of the board and the lower right image shows the internal layer of a lower density and having more gaps which makes the density decrease. This behavior is related to the viscoelastic properties of the wood and the moisture content of each layer. Source: *COST Action FP1005, Working Group Meeting (WG3) Nancy,* 13 Oct. 2011, Bern University of Applied Sciences, Heiko Thoemen
Figure 3:
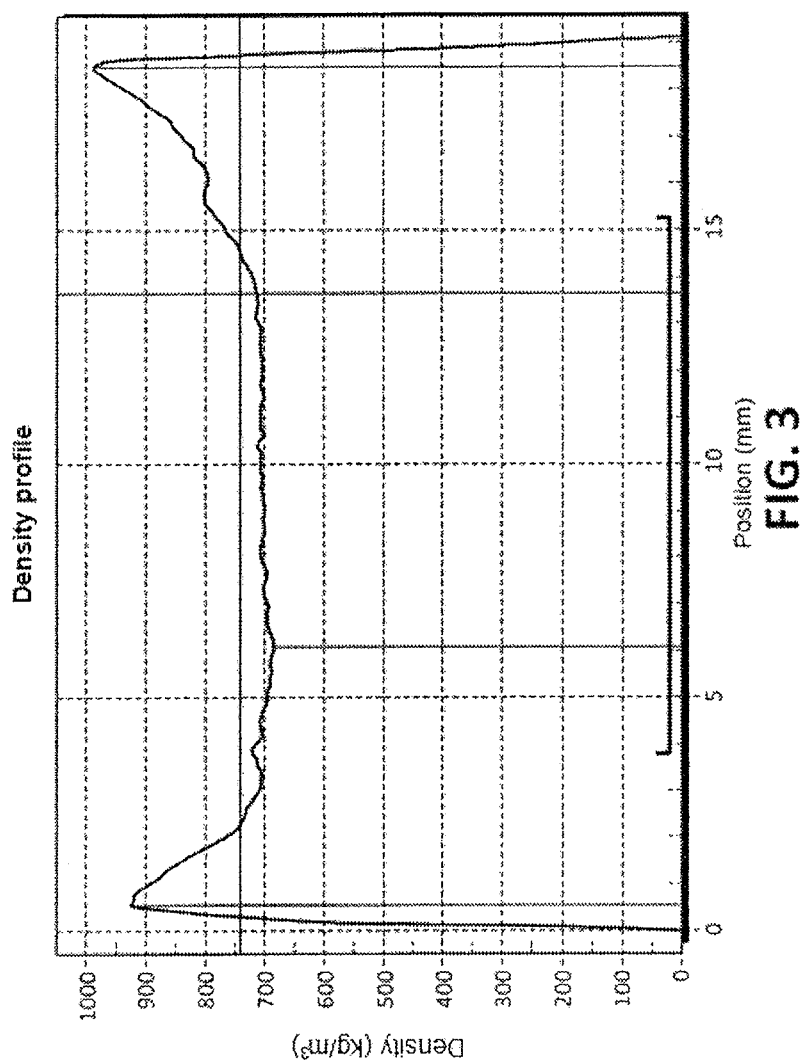
FIG. 3 shows a density profile of a trilayer MDF board that has asymmetry as a result of a different moisture content between surfaces. This is a quality defect present in conventional productions, widely known in the sector and which leads to warping.

FIG. 2 shows the effect of the pressure applied on the formation of the board and how it leads to deformations of the wood cells, reducing the cell lumens, which leads to an increase in the density. This effect is reflected in said figure where the graph shows the curve of densities of the board along the cross section thereof where two peaks of maximum density coinciding with the external faces of the board and a gradual decrease until reaching the center of the board, where a minimum density of the board is reached, is obtained. FIG. 2 shows a typical distribution graph of the densities in the thickness of the board. The lower part of this graph shows images of the densest external layers, as shown in the image on the left where the spaces are smaller and the fibers are more compacted, and in the image on the right where the gaps are larger and therefore, the density significantly decreases.

FIG. 4 show the density profile of a board, produced by a method different from that of the invention, with external fiber layers, one of them being 4 mm and the other 2 mm, and one or several inner particle layers (FIG. 4.1). The behavior of this board produced in this way was not stable.

FIG. 4.2 shows the density profile with respect to the axis in order to clearly display the asymmetries with respect to the center. The behavior of this board will clearly be unstable and it will lead to the warping of the board due to the stresses that this difference in density between one face and the other of said board will cause.

FIG. 4.3 has carried out the same previous exercise, but only with the particle layers. In this new representation, it is observed that the densification between the particles on both sides of the axis is very similar, which demonstrates that warping is caused by the fiber layers of different thicknesses.

In particular and surprisingly, the possibility of manufacturing multilayer boards with independent weight control, granulometry and moisture allows for embodiments with external layers of clearly different thicknesses, since corrections to maintain a flat and stable result are subsequently possible. In conventional processes, these embodiments are not possible while maintaining flatness since the forces generated are significant and are reflected in the appearance of warping.

This is reflected in the density profiles of FIG. 5, which have been taken from a board manufactured from the method of the invention. FIG. 5.1 shows a density profile of a board with external fiber layers, one of them being 4 mm and the other 2 mm, and one or several inner particle layers.

FIG. 5.2 shows the density profile with respect to the axis to clearly display the asymmetries with respect to the center.

FIG. 5.3 has carried out the same previous exercise, but only with the particle layers. In this new representation, it is observed that the densification between the particles on both sides of the axis also show asymmetrical behavior. These assymetries allow for the compensation of forces between strata. FIG. 5.3, in comparison to FIG. 4.3, demonstrates that in 4.3 it is not possible to compensate for warping caused by the external fiber layers of differing thicknesses.

The invention proposes the incorporation of n strata between the external layers and the central layer that enables specific adjustment in each one, such that it is possible to adjust the conditions thereof, seeking a final density for each one. Furthermore, two large groups A and B are defined, in which A is the material comprised between the upper surface of the board and the central plane that has 1,2,_, n strata; and B is the material comprised between the central plane and the lower surface of the board that has 1', 2',_, n' strata. As a preferred embodiment, it is sought that the values of average density of each group are as equal as possible, with differences smaller than 10%, preferably 5% and more preferably 3%. The n strata within the assembly A may have densities different than the corresponding n' thereof of the assembly B, provided that they fulfill the previous condition among the average values of each group.

Figure 6:
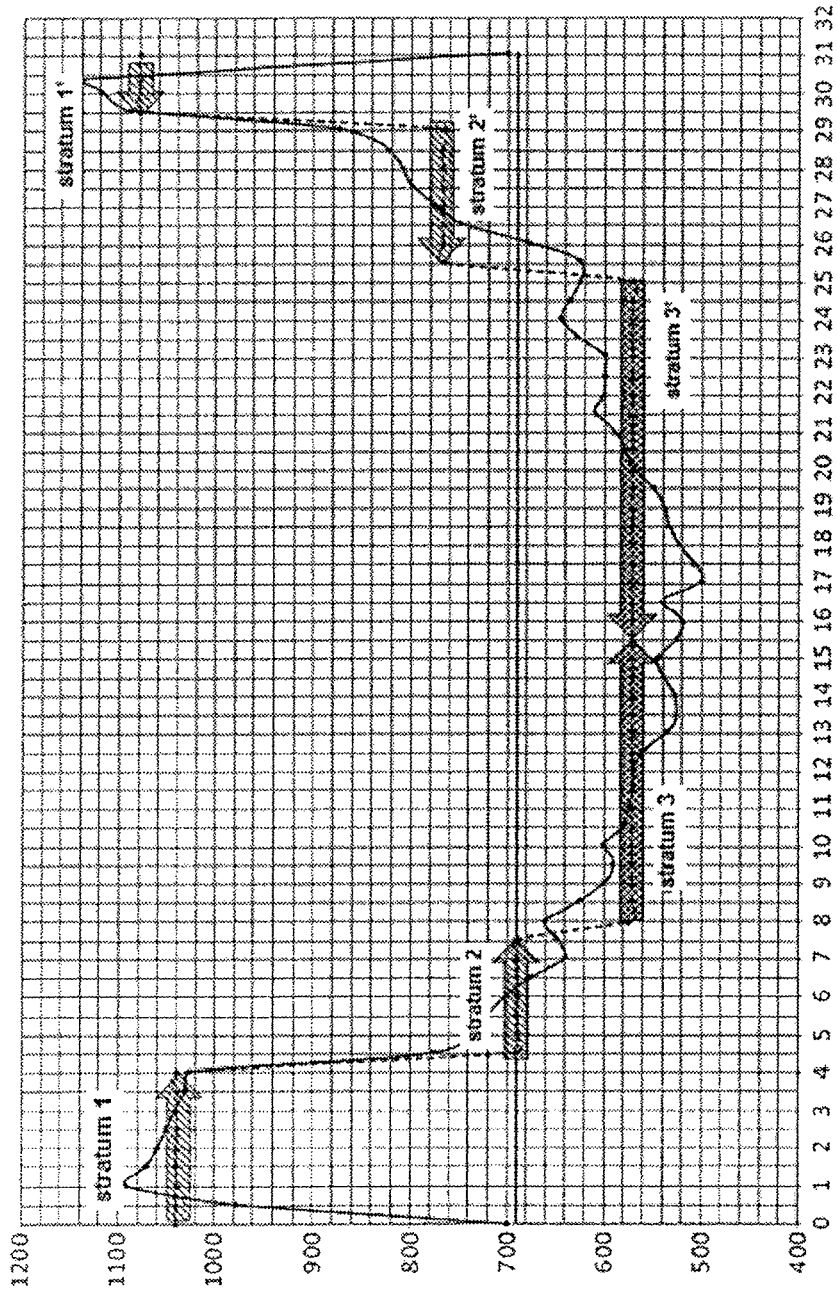
FIG. 6 shows a graph of how the profile of a board can be designed to achieve a stable board without warping.

In FIG. 6, a graph is shown of how the profile of a board can be designed in order to manufacture a stable board without warping, such that the profile is divided into 6 strata, two outer strata 1 and 1' that form the external faces that are formed by fibers, inner stata 2 and 2' that may be formed by particles, and more inner strata 3 and 3' formed by particles larger than those of the strata indicated above.

Figure 7:
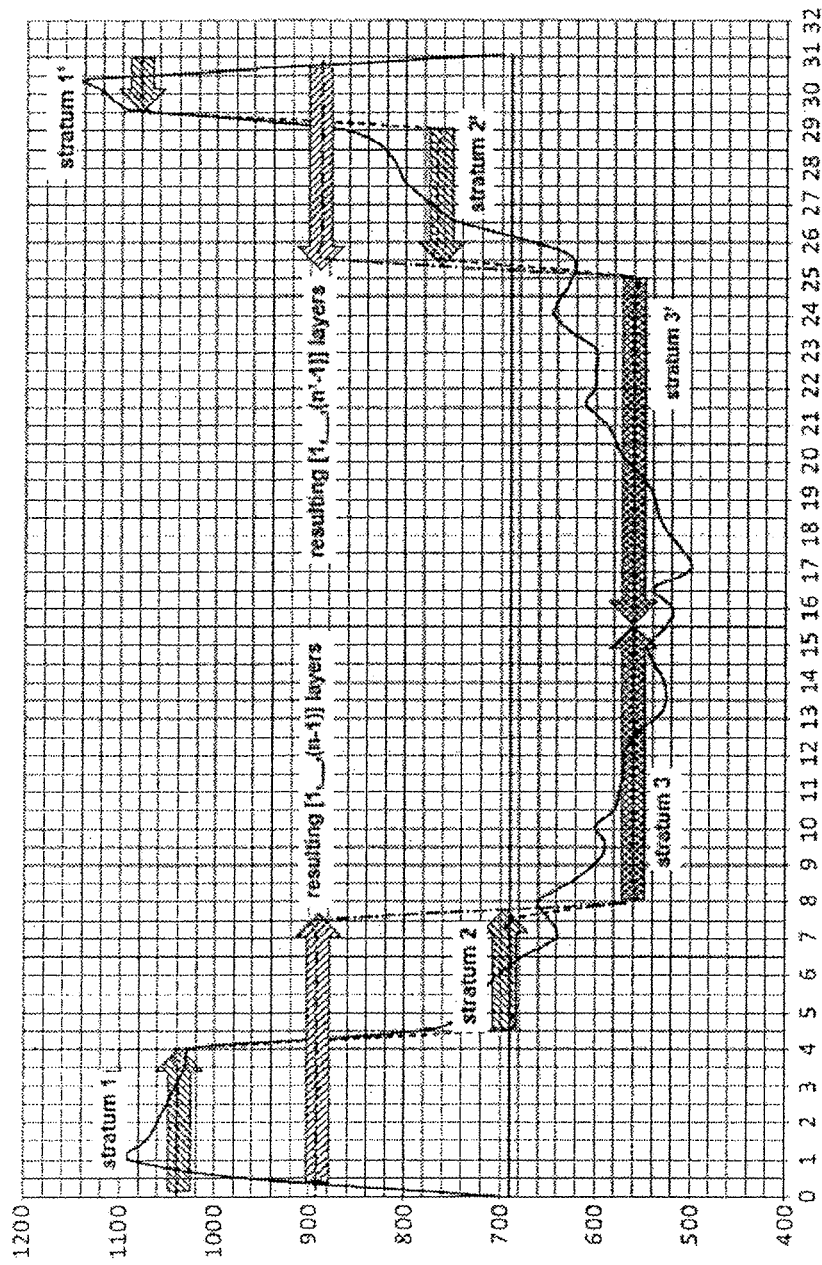
FIG. 7 shows a graph combining the resulting densities of n layers of equal or different material used.

FIG. 7 shows a graph combining the resulting densities of n layers of equal or different material used, such that if we did not heed the graph of FIG. 6, we would have to ensure the following is fulfilled:

Average density (strata 1+strata 2+strata 3)≈Average density(strata 1'+strata 2'+strata 3')

If we used the calculation of that shown in FIG. 7, we would arrive at a calculation that would be:

Average density (strata 1+strata 2)=Average density (strata 1'+strata 2')

and more generally:

Average density (strata 1+strata 2+ . . . +strata $(n-1)$)≈Average density (strata 1'+strata 2'+ . . . +strata $(n'-1)$)

Example 1.—Asymmetrical Board

A board has been produced according to the method of the invention, formed by 5 layers, the outer faces of which that make up the "Upper fiber" and "Lower fiber" have been made from wood fibers and binder with uncompensated thicknesses in both faces of 4.6 mm and 2.2 mm; the layers closer to the inside are fine particle layers with thicknesses of 3.1 mm and 2.9 mm and even closer to the inside there is a single layer of coarser particles with a thickness of 18.2 mm.

|  | Upper fiber | Upper outer layer | Inner layer | Lower outer layer | Lower fiber | Total |
|---|---|---|---|---|---|---|
| dry kg/m2 | 4.78 | 2.15 | 9.75 | 2.24 | 2.46 | 21.38 |
| layer mm | 4.6 | 3.1 | 18.2 | 2.9 | 2.2 | 31 |
| density | 1039 | 700 | 535 | 770 | 1118 | 690 |
| dry kg/m2 | | 6.93 | 9.75 | 4.7 | | 21.38 |
| layer mm | | 7.7 | 18.2 | 5.1 | | 31 |
| density | | 903 | 535 | 920 | | 690 |

In the upper part of the table, the layers are considered independently and it is observed how the density of each layer is different, indicating that the densities of the layers of the right side of the table are greater. This calculation was made by following the practice of FIG. 6 in which the layers are considered independently.

The three lower rows of the table have been established by considering the grouping of the outer fiber layer and the outer particle layer and considering the central layer. In this way, it is observed that the density of the grouped outer layers is compensated and it is observed that the board is compensated and free of stresses.

Example 2.—Symmetrical Board

A board has been produced according to the method of the invention, formed by 5 layers, the outer faces of which that make up the "Upper fiber" and "Lower fiber" have been made from wood fibers and binder with compensated thicknesses.

|  | Upper fiber | Upper outer layer | Inner layer | Lower outer layer | Lower fiber | Total |
|---|---|---|---|---|---|---|
| dry kg/m2 | 2.02 | 1.7 | 12.36 | 1.7 | 2.02 | 19.80 |
| layer mm | 2.11 | 2.5 | 21.7 | 2.6 | 2.1 | 31 |
| density | 957 | 676 | 570 | 656 | 962 | 639 |
| dry kg/m2 | | 3.72 | 12.36 | 3.72 | | 19.8 |
| layer mm | | 4.6 | 21.7 | 4.7 | | 31 |
| density | | 804 | 570 | 793 | | 639 |

In the upper part of the table, it is observed that the layers are considered independently and how the balanced densities are found from the central geometric plane. This calculation was made by following the practice in FIG. 6 in which the layers are considered independently. The three lower rows of the table have been established by considering the grouping of the outer fiber layer and the outer particle layer and considering the central layer. Obviously, in this case it is observed that the density of the grouped outer layers is compensated and as a result, the board is compensated and free of stresses.

Figure 8:
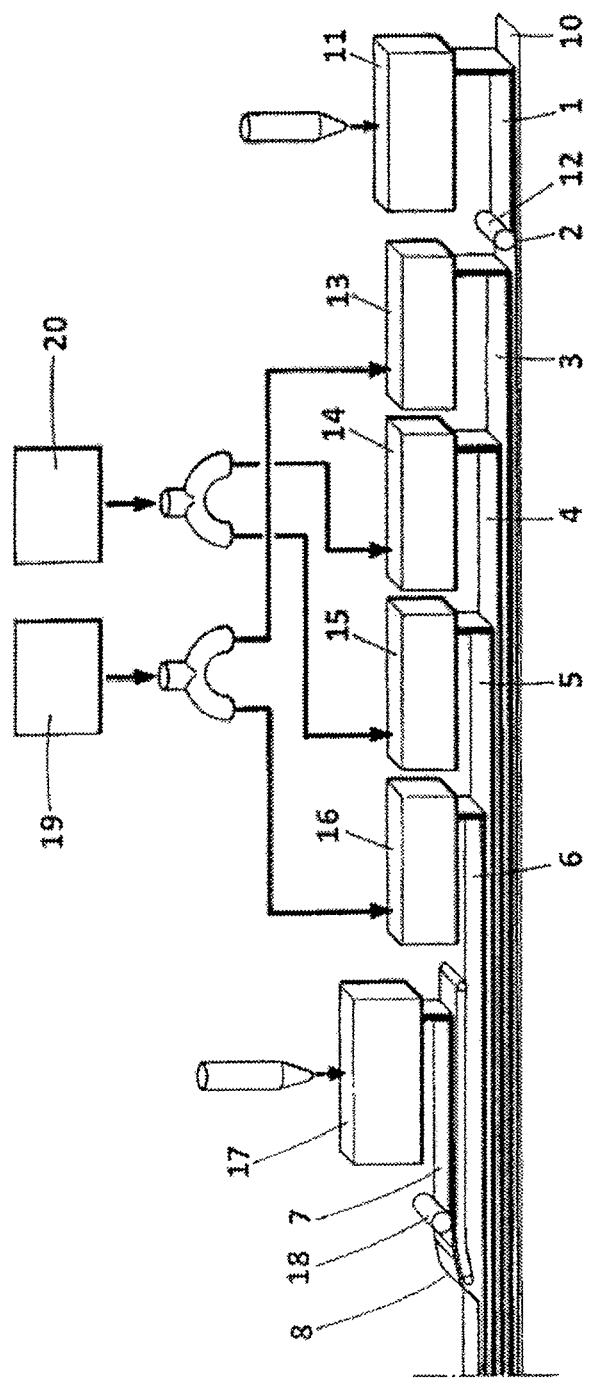
FIG. 8 shows a schematic view of a facility for producing boards, more specifically for a facility for boards formed by six stacked layers.

In FIG. 8, a diagram of the production of a symmetrical or asymmetrical board is observed. A production facility is provided, formed by a conveyor belt (10) on which a series of layers coming from the formers (11), (13), (14), (15), (16) and (17) are deposited; the first former (11) and the last former (17) are responsible for depositing the fiber layers (1) and (7) that will form the external layers of the board, while the intermediate formers (13), (14), (15) and (16) will deposit the the previously separated particles coming from the deposits (19) and (20), such that, for example, the smaller particles that will form the layers next to the external fiber layers will be in the deposit (19), while the coarser particles that will form the central layers of the formed board and will be embedded therein will be in the deposit (20).

Subsequent to the deposit, fibers in the former (11) have pre-compacting means (12) of the fiber layer (1), such as rollers, while the deposit of fibers coming from the former (17) are deposited on an auxiliary conveyor belt where they are pre-compacted by means of second pre-compacting means (18), such as pre-compaction rollers, before depositing the fiber layer on top of the formed mat.

The lower part of this schematic drawing shows the layers deposited under the formers and how the fiber and/or particle mat is formed during the construction thereof.

The method for producing this laminated board formed by 6 layers comprises the following steps:
  a) deposit on a first surface (10), which will preferably be a conveyor belt, a plurality of fibers mixed with binder substances (1) and/or other chemical additives, controlling the weight of said layer and shaping a first external layer of the board to be formed. This deposit is made on a conveyor belt that moves while the fibers and/or particles that will form the first deposited layer or external layer of the finally formed board are deposited in the form of a mat.
  b) Pre-compact using pressure by using the first pre-compacting means (12) of said first fiber layer (1) deposited on the conveyor belt, shaping a first external layer (2);
  c) deposit multiple stacked fiber or particle layers (3), (4), (5) and (6) mixed with binder substances and/or other chemical additives on the first pre-compacted layer (2) made, individually controlling the weight of each layer. These multiple layers, upon manufacturing the final board of 6 layers, will be formed by a fine particle layer (3), followed by coarse particle layers (4) and (5) and subsequently followed by a fine particle layer (6), forming a mat of multiple stacked layers;
  d) deposit a plurality of fibers mixed with binder (7) and/or other chemical additives, on the shaped mat in letter c) above, controlling the weight of said layer and shaping a second pre-compacted external layer of the board (8) by means of the second pre-compacting means (18);
  e) pre-compact, not shown in the figures, and optionally pre-heat the assembly of layers deposited in the previous steps, for example, by means of reheated water vapor, reheated air, electrical stimulation (such as, for example, by high frequency, microwaves, etc.), this relation not being limiting on the invention;
  f) compact the multiple layers deposited in the steps a) to e) in order to form the board in the final thickness thereof by using pressure and heat, not shown in the figures.

The particles used are previously classified by size, grouping similar sized particles so that the layers that are formed in the structure of the board are as homogeneous as possible in each layer with regard to the particle size. These particles are classified by size and are grouped to form pairs of layers of similar sized particles in the board to be formed.

Preferably, the layers of larger particles will be deposited in the central area of the board while the smaller particles will be deposited progressively towards the external layers of the board to be formed, with the aim that the finish of the board is as uniform as possible. This order will make it easier for larger particles to be embedded inside the board and not be visible from the external layers thereof, providing a higher quality aesthetic appearance to the product and avoiding the visual defect of movement in the visible face of the board of the larger particles deposited inside the board.

When binders and/or chemical additives are added to the process for producing the laminated board of the invention, it may be necessary to apply pigments or ink that determine the final color of said board or of at least one of the layers of said board. The application of the pigments or ink is carried out in a way such that they are or are not mixed with the binders and/or additives.

The invention claimed is:

1. A method for producing laminated boards, each board having multiple layers and comprising a combination of wood fibers and/or particles with at least one binder and/or other chemical additives, said layers made by stacked deposition thereof on a conveyor belt until a mat is produced which comprises fibers and/or particles in a multilayer form, in which the layers are physically different from one another, said method comprising:
    defining final thickness and density of the board;
    defining the number of layers that will form the board;
    selecting, for each layer to be formed, a material of the layer to be formed, said selecting the material including:
      selecting fibers and/or particles;

selecting, for each layer, granulometry of the material of the layer;

selecting, for each layer, a ratio of the weight of binder material and/or other chemical additives to the weight of fibers and/or particles, to be used in the material of the layer; and selecting the percentage of moisture of each layer of the mat, in which the external layer or layers that will form the board will have a maximum moisture content of 18% over dry weight of the product, and the internal layer or layers that will form the board will have a minimum moisture content of 3% over dry weight of the product, with an absolute difference of moistures between adjacent layers that will be in the range of 1 to 12 points based on the number of strata that form the mat, with a gradual distribution of moisture from the external layers to the geometric center of the board;

preparing each layer, which comprises the addition of fibers and/or particles with binder material and/or other chemical additives until a homogeneous mass is formed in which the weight thereof per m2 is the result of the product of the density of the material without moisture multiplied by the thickness of each layer and increased by the moisture percentage corresponding to said layer;

depositing, in a stacked and staggered manner, the layers previously defined according to weight per m2 of each layer, as defined in the preceding paragraph, a deposit that is carried out on a conveyor belt until the final formation of a mat defined by the stacking of multiple layers comprising fibers and/or particles mixed with binder substances and/or other chemical additives and where the total number of layers included in said mat is equal or greater than 4;

pre-compacting and optionally pre-heating the mat comprising fibers and/or particles mixed with binder substances and/or other chemical additives deposited on the conveyor belt;

compacting the mat which comprises fibers and/or particles mixed with binder substances and/or other chemical additives deposited and pre-compacted in the previous steps by using pressure and heat until forming the final board, where the sum of material densities from the outer layers to the geometric center of the board are substantially similar to both sides of the final board manufactured.

2. The method for producing laminated boards according to claim 1, wherein the layers on either side of the geometric center of the board form an asymmetrical board by thickness of the layers and/or material used therein and/or by the number of deposited layers.

3. The method for producing laminated boards according to claim 1, wherein the layers on either side of the geometric center of the board form a symmetrical board formed by pairs of similar layers on both sides of the geometric center.

4. A symmetrical laminated board where each layer comprises a combination of fibers and/or particles with at least one binder made by a method according to claim 3, wherein the laminated board is formed by a structure comprising:
external fiber layer;
internal particle layer that in turn is divided into: outer external fine particle layer; inner internal coarse particle layer; outer external fine particle layer; and external fiber layer.

5. The method for producing laminated boards according to claim 1, wherein the absolute difference of moistures between adjacent layers is comprised between 1-10.

6. The method for producing laminated boards according to claim 1, wherein the difference between the sum of material densities from the outer layers to the geometric center of the board between the two geometric halves of the final manufactured board has a maximum difference between the two halves of 10%.

7. The method for producing laminated boards according to claim 1, wherein the geometric center of the board coincides with a plane of separation between layers of the board or it may be included within the thickness of a layer, dividing said layer into two areas, each one being considered, with regard to the sum of densities, as belonging to one area or another of the obtained board.

8. The method for producing laminated boards according to claim 1, wherein at least one of the external layers of the board is made from fibers.

9. The method for producing laminated boards according to claim 1, wherein at least one of the external layers of the board is made from particles.

10. The method for producing laminated boards according to claim 1, wherein the binders are selected from the group consisting of thermosetting resins, phenoplasts and/or aminoplasts and/or organic isocyanates which have at least two isocyanate groups, in thermoplastic resins and in bioresins, or combinations thereof.

11. The method for producing laminated boards according to claim 1, wherein at least one of the outer faces of the board is coated by lacquer and/or PVC coating and/or resin impregnated paper and/or natural veneer and/or HPL (High Pressure Laminate).

12. The method for producing laminated boards according to claim 1, wherein with the addition of binders and/or chemical additives to the process for producing the laminated board, pigments or ink that determine the final color of said board or of at least one of the layers of said board are applied.

13. An asymmetrical laminated board where each layer comprises a combination of fibers and/or particles with at least one binder made by a method according to claim 1.

14. The laminated board according to claim 13, wherein the laminated board comprises outer fiber layers, while the inside thereof is divided into a central particle layer and particle layers on both sides of the central layer, and the particles of the central layer are larger than the particles of the layers that are on both sides of the central layer.

15. A multilayer laminated board manufactured by performing the method according to claim 1, wherein the layers are deposited such that the final board is an asymmetrical laminated board, and the sum of material densities from the outer layers to the geometric center of the board are substantially similar to both sides of the final board manufactured.

16. A multilayer laminated board manufactured by performing the method according to claim 1, wherein the layers are deposited such that the final board is a symmetrical laminated board, and the sum of material densities from the outer layers to the geometric center of the board are substantially similar to both sides of the final board manufactured.

17. The method for producing laminated boards according to claim 1, wherein the absolute difference of moistures between adjacent layers is comprised between 1-7.

18. The method for producing laminated boards according to claim 1, wherein the absolute difference of moistures between adjacent layers is comprised between 1-2.

19. The method for producing laminated boards according to claim 1, wherein the difference between the sum of material densities from the outer layers to the geometric center of the board between the two geometric halves of the final manufactured board has a maximum difference between the two halves of 5%.

20. The method for producing laminated boards according to claim 1, wherein the difference between the sum of material densities from the outer layers to the geometric center of the board between the two geometric halves of the final manufactured board has a maximum difference between the two halves of 3%.

* * * * *